United States Patent
Bains (10) Patent No.: US 8,321,778 B2
(45) Date of Patent: Nov. 27, 2012

(54) EFFICIENT IN-BAND RELIABILITY WITH SEPARATE CYCLIC REDUNDANCY CODE FRAMES

(75) Inventor: Kuljit Bains, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 993 days.

(21) Appl. No.: 12/139,610

(22) Filed: Jun. 16, 2008

(65) Prior Publication Data

US 2009/0313533 A1 Dec. 17, 2009

(51) Int. Cl.
*H03M 13/00* (2006.01)
*G06F 11/10* (2006.01)
(52) U.S. Cl. .................... 714/807; 714/763; 714/799
(58) Field of Classification Search .............. 714/763, 714/799, 807
See application file for complete search history.

(56) References Cited

U.S. PATENT DOCUMENTS

| | | |
|---|---|---|
| 6,519,733 B1 | 2/2003 | Har et al. |
| 2002/0050959 A1* | 5/2002 | Buckelew et al. ............ 345/55 |
| 2004/0027261 A1 | 2/2004 | Tymchuk et al. |
| 2005/0108611 A1 | 5/2005 | Vogt et al. |
| 2007/0057835 A1 | 3/2007 | Jarman et al. |
| 2008/0005646 A1 | 1/2008 | Bains |
| 2008/0065851 A1* | 3/2008 | Balb et al. ................ 711/165 |

FOREIGN PATENT DOCUMENTS

| | | |
|---|---|---|
| KR | 1020080023151 | 3/2008 |
| WO | 2010/005661 A2 | 1/2010 |
| WO | 2010/005661 A3 | 3/2010 |

OTHER PUBLICATIONS

International Search Report for corresponding matter, mailed Dec. 30, 2009.
International Preliminary Report on Patentability received for PCT Patent Application No. PCT/US2009/046429, mailed on Dec. 29, 2010, 7 pages.
Office Action for Application No. 10-2010-7021286 dated Dec. 22, 2011, 9 pages.
International Search Report and Written Opinion for Application No. PCT/US2009/046429 dated Dec. 30, 2009, 8 pages.
International Preliminary Report on Patentability for Application No. PCT/US2009/046429 dated Dec. 18, 2010, 6 pages.
EP Search Report for Application No. 09794874.9 dated Jul. 26, 2012, 3 pages.
Office Action for Application No. 10-2010-7021286 dated Aug. 29, 2012, 6 pages.
Office Action for Application No. 09794874.9 dated Aug. 7, 2012, 9 pages.

* cited by examiner

*Primary Examiner* — Guy Lamarre (74) *Attorney, Agent, or Firm* — Blakely, Sokoloff, Taylor & Zafman LLP (57) ABSTRACT

Embodiments of the invention are generally directed to systems, methods, and apparatuses for efficient in-band reliability with separate cyclic redundancy code (CRC) frames. In some embodiments, a memory system uses data frames to transfer data between a host and a memory device. The system also uses a separate frame (e.g., a CRC frame) to transfer a CRC checksum that covers the data frames.

32 Claims, 9 Drawing Sheets

EFFICIENT IN-BAND RELIABILITY WITH SEPARATE CYCLIC REDUNDANCY CODE FRAMES

TECHNICAL FIELD

Embodiments of the invention generally relate to the field of integrated circuits and, more particularly, to systems, methods and apparatuses for efficient in-band reliability with separate cyclic redundancy code (CRC) frames.

BACKGROUND

The rate at which information is transferred on dynamic random access memory (DRAM) channels continues to increase. These faster transfer rates dictate the use of mechanisms for improved error coverage. Conventional approaches to improving error coverage involve adding pins to the channel. In modern memory systems, the DRAM channel is pin constrained. Thus, conventional approaches to improving error coverage are not suitable for modern memory systems.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments of the invention are generally directed to systems, methods, and apparatuses for efficient in-band reliability with separate cyclic redundancy code (CRC) frames. In some embodiments, a memory system uses data frames to transfer data between a host and a memory device. The system also uses a separate frame (e.g., a CRC frame) to transfer a CRC checksum that covers the data frames. The data frame and the CRC frame may be one or more user intervals (UI) in length, depending on the implementation. For example, in some embodiments, the length of the CRC frame may be a multiple (x1, x2, . . . , xn) of 4 UI. Such embodiments may, for example, support quad rate clocking. As is further discussed below, the use of a separate CRC frame enables a memory system to support an efficient approach to in-band CRC protection.

Figure 1:
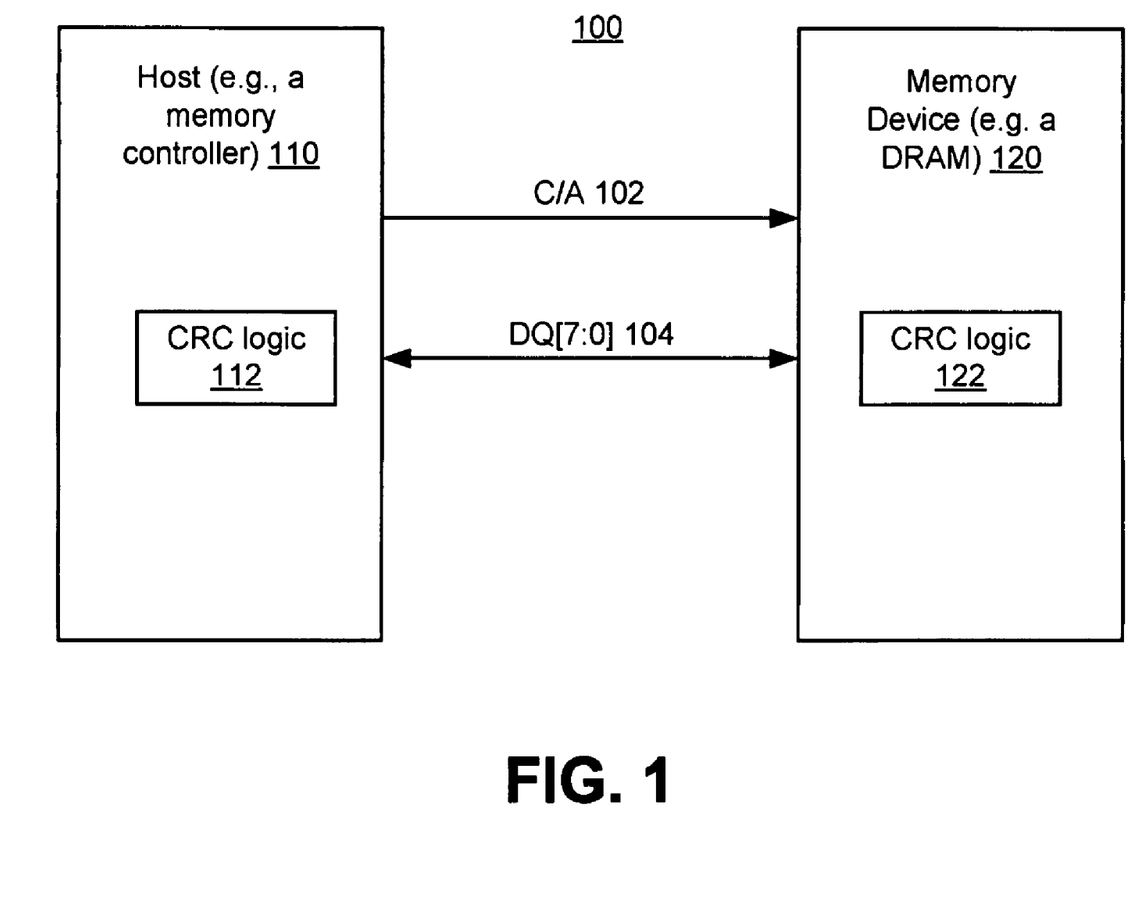
FIG. 1 is a high-level block diagram illustrating selected aspects of a computing system implemented according to an embodiment of the invention.

FIG. 1 is a high-level block diagram illustrating selected aspects of a computing system implemented according to an embodiment of the invention. In the illustrated embodiment, system 100 includes host 110 (e.g., a memory controller) and memory device 120 (e.g., a DRAM). In alternative embodiments, system 100 may include more elements, fewer elements, and/or different elements.

Memory device 120 includes CRC logic 122. Embodiments of the invention are described with respect to using CRC to provide error coverage for transmission errors. It is to be appreciated, however, that in alternative embodiments a different error bit mechanism may be used. The term "error bit" (e.g., a CRC bit) refers to a bit that provides error coverage for one or more data bits.

In some embodiments, CRC logic 122 enables memory device 120 to support an in-band CRC mechanism (e.g., on DQ lines 104). The term "in-band CRC mechanism" refers to supporting CRC (or other error bit scheme) without adding additional pins. For example, CRC logic 122 may include logic to separately frame a CRC checksum from one or more data frames that are covered by the checksum. In the write direction, CRC logic 122 may enable memory device 120 to separate a write CRC frame from a write data frame that is received over DQ bus 104. The received write checksum may be compared with a locally generated (e.g., generated on memory device 120) checksum to check for transmission errors. For ease of description, the terms "interconnect" and "bus" are used interchangeably in this document.

Command/Address (C/A) lanes 102 provide a plurality of lanes for sending commands and addresses to memory device 120. DQ lanes 104 provide a bi-directional read/write data bus. In alternative embodiments, DQ lanes 104 may be uni-directional. For ease of description, embodiments of the invention are described with reference to a x8 memory device. It is to be appreciated, however, that embodiments of the invention may include other device data widths such as x4, x16, x32, etc.

Host 110 controls the transfer of data to and from memory device 120. In some embodiments, host 110 is integrated onto the same die as one or more processors. In other embodiments, host 110 is part of a computing system's chipset. Host 110 includes CRC logic 112. CRC logic 112 enables host 110 to support an in-band CRC mechanism. For example, CRC logic 112 enables host 110 to separately frame data bits and corresponding CRC bits. The resultant data frames and corresponding CRC frames are transferred to memory device 120 via DQ bus 104. In the read direction, host 110 generates a local CRC checksum that can be compared with a CRC checksum from memory device 120 to determine whether transmitted data has been corrupted.

As the transfer rates on DQ bus 104 increase, there is a greater need for CRC protection to mitigate transmission errors. The conventional approach to supporting CRC includes adding an extra pin per eight data pins. In the illustrated embodiment, however, there is no need to add additional pins because the CRC checksums are transferred in-band (over DQ bus 104).

Host 110 may issue a number of different commands to control the transfer of data with memory device 120. For example, the write command used to transfer data is labeled as "W_d." In some embodiments, a new command encoding is defined to transfer the write CRC frame (e.g., W_crc). A single write command that transfers one or more data frames and an associated CRC frame may also be defined (e.g., W_d_crc).

Similarly, the read data command is labeled as "R_d." A new command encoding to transfer the read CRC frame is defined (e.g., R_crc). The host can (optionally) request the read CRC frame in conjunction with the read data using a single command (e.g., R_d_crc).

Figure 2:
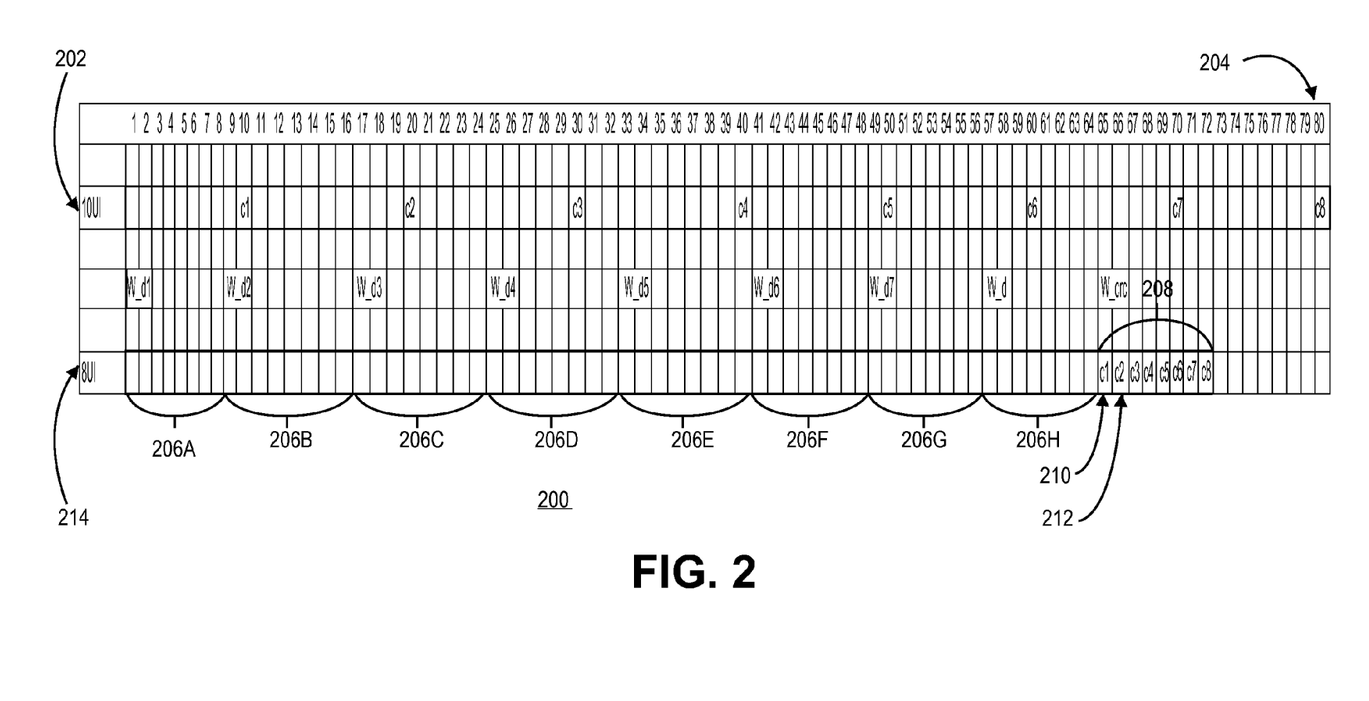
FIG. 2 illustrates selected aspects of a protocol for writing data frames and separate error bit frames to a memory device, implemented according to an embodiment of the invention.

FIG. 2 illustrates selected aspects of a protocol for writing data frames and separate error bit frames to a memory device, implemented according to an embodiment of the invention. FIG. 200 shows eight data transfers using 10 UI frames (202). It takes 80 UI to complete the transaction (204). The bottom part of FIG. 2 shows the same transaction using 8 UI data frames (206) and one CRC frame at the end (208). The CRC frame (208) contains CRC bits corresponding to the eight data transfers. The first UI of the CRC frame (210) has CRC bits corresponding to the first data frame (e.g., 206A), the second CRC UI (212) corresponds to the second data frame (206B), and so on. In the illustrated embodiment, it takes 72 UI to transfer eight data frames and one CRC frame (214). This is an improvement of 10% over the baseline case using 80 UI (202) to complete the same transaction. The write data frames are shown to be contiguous for illustration only. The write frames can be spread out and/or interspersed with read frames.

Figure 3:
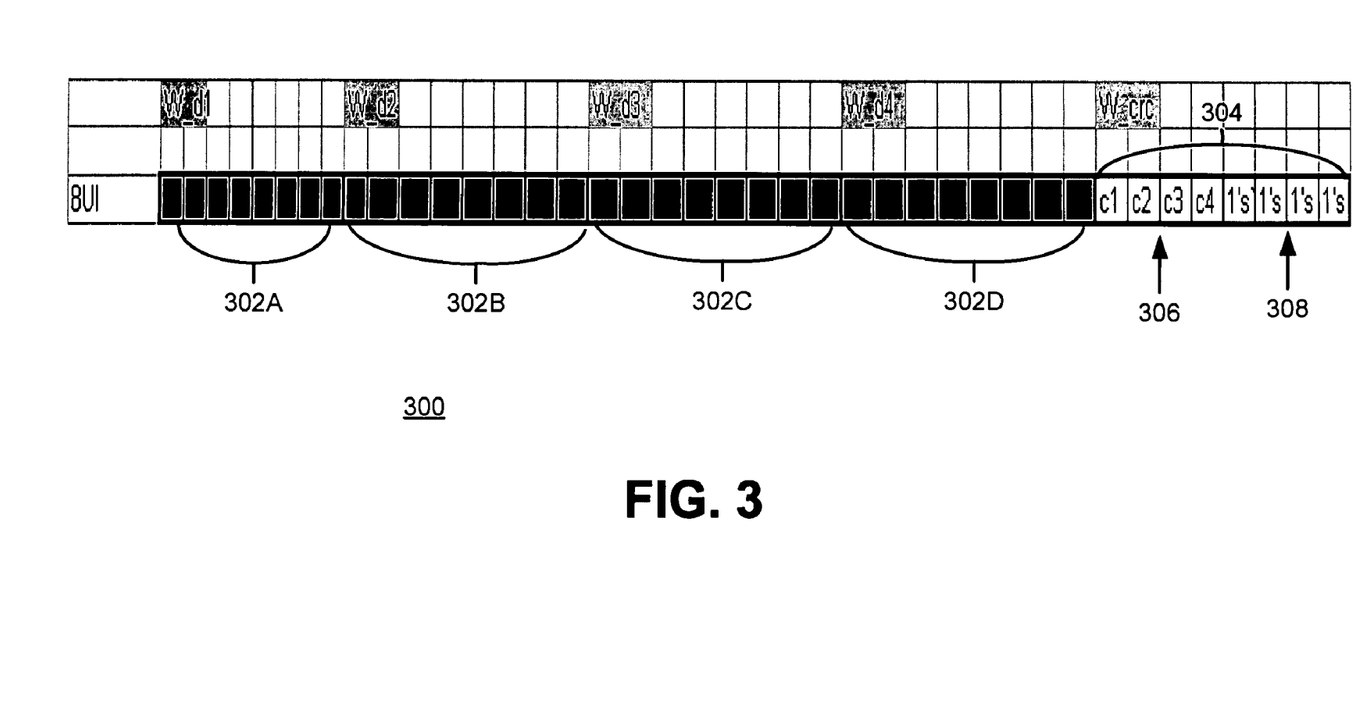
FIG. 3 illustrates selected aspects of a write error bit frame format, implemented according to an embodiment of the invention.

In some embodiments, the host may transfer CRC frames in which only a subset of the UI are used. That is, some of the UI contain CRC bits and some do not. FIG. 3, for example, illustrates write transaction 300 including four write data frames 302 and one write CRC frame 304. CRC frame 304 has eight UI but only four of the UI contain CRC bits (306) to cover the data in the write data frames 302. The remaining four UI (308) contain data that is not used. In the illustrated embodiment, the unused UI (308) contain all ones to reduce power consumption in a Vddq terminated bus. In some embodiments, a transaction that includes four transfers (e.g., transaction 300) uses 40 UI. This is the same number of UI that a similar transaction using 10UI frames would use.

FIGS. 2 and 3 illustrate embodiments in which the DRAMs are x8 devices. In alternative embodiments, devices having a different width may be used (e.g., x8, x16, x32, etc.). In some embodiments, x16 wide devices are treated as two x8 devices in parallel. Thus, the protocol for x8 and x16 devices is, in some embodiments, substantially the same. In some embodiments, 8 bits of CRC cover 64 bits of data for both x8 and x16 devices. The x16 data frame has 128 bits of data with an 8 bit CRC covering the top half of the data and another 8 bit CRC covering the bottom half of the data.

The above-described embodiments are discussed with reference to a CRC frame that is eight UI wide. In alternative embodiments, the CRC frame may be smaller in length (e.g., to improve efficiency). For example, in some embodiments, a four UI wide CRC frame may be implemented. In such embodiments, the CRC registers may be 32 bit registers. In yet other alternative embodiments, the CRC frame is a multiple of four UI in length. For example, (in addition to 4 UI and 8 UI), the length of the CRC frame may be 12 UI, 16 UI, 20 UI, etc. In some embodiments, however, the use of a 12 UI long CRC frame may result in a performance loss in peak bandwidth (e.g., ~33%).

Figure 4:
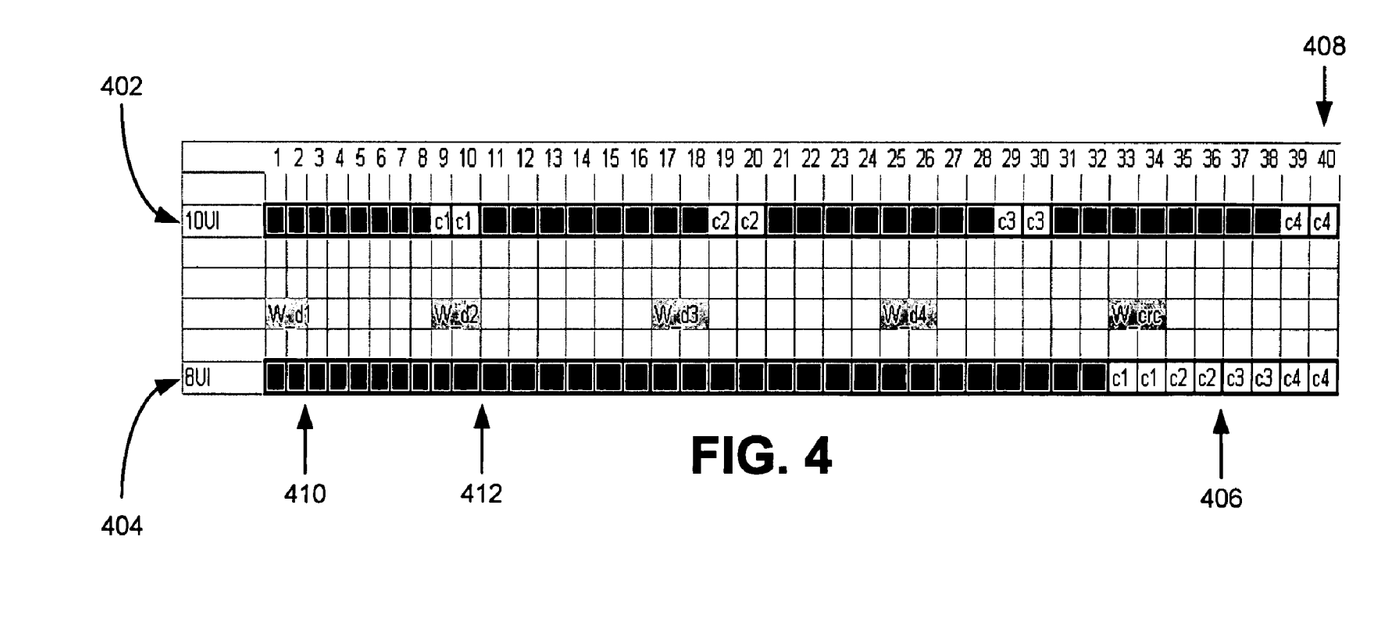
FIG. 4 illustrates selected aspects of a write error bit frame format for a x4 device, implemented according to an embodiment of the invention.

FIG. 4 illustrates selected aspects of a write error bit frame format for a x4 device, implemented according to an embodiment of the invention. FIG. 400 shows four data transfers using 10 UI frames (402). It takes 40 UI to complete the transaction (408). The bottom part of FIG. 4 shows the same transaction using 8 UI data frames (404) and one CRC frame at the end (406). The CRC frame (406) contains CRC bits corresponding to the eight data transfers. The first two UI of the CRC frame (406) have CRC bits corresponding to the first data frame (e.g., 410), the second two UI of the CRC frame corresponds to the second data frame (412), and so on. In the illustrated embodiment, it takes 40 UI to transfer eight data frames and one CRC frame. The write data frames are shown to be contiguous for illustration only. The write frames can be spread out and/or interspersed with read frames.

Figure 5:
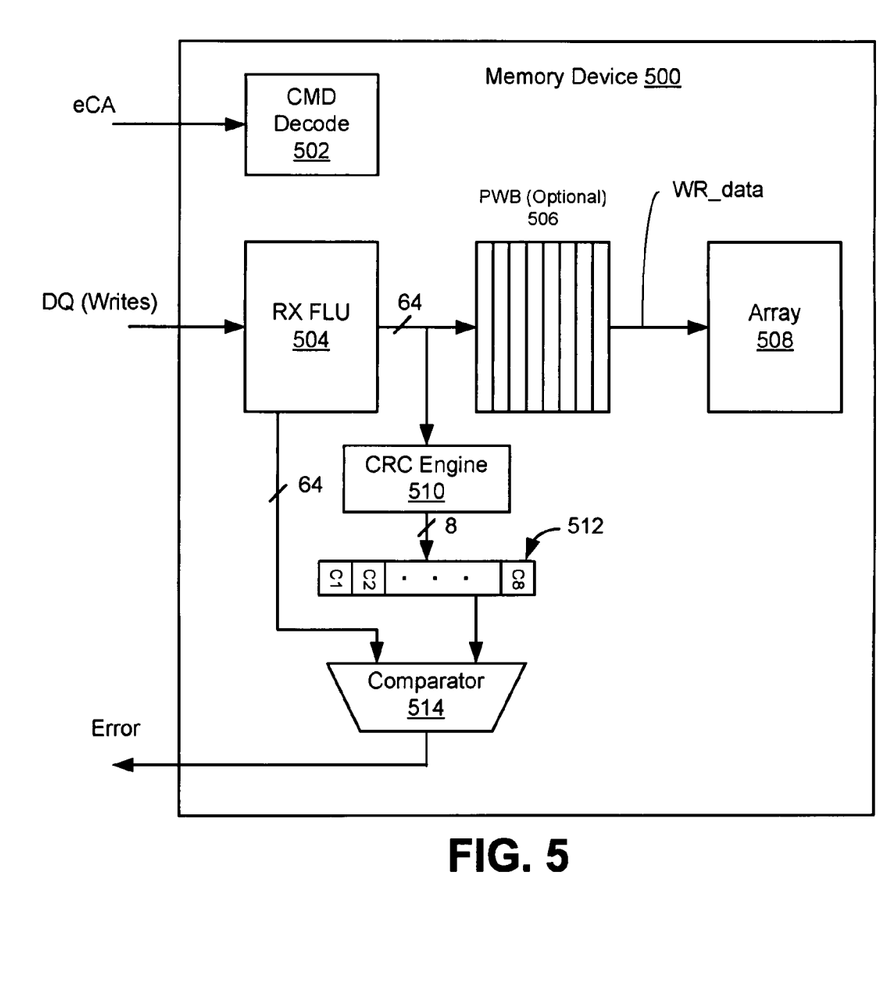
FIG. 5 is a block diagram illustrating selected aspects of a write data path for a memory device implemented according to an embodiment of the invention.

FIG. 5 is a block diagram illustrating selected aspects of a write data path for a memory device implemented according to an embodiment of the invention. Memory device 500 includes, inter alia, command decode logic 502, receive framing unit 504, posted write buffer 506 (optional), memory array 508, CRC engine 510, CRC register 512, and comparator 514. In alternative embodiments, memory device 500 may include more elements, fewer elements, and/or different elements. In some embodiments, memory device 500 is a dynamic random access memory device (DRAM).

In operation memory device 500 receives a write command from the host (e.g., host 110) on the C/A bus (e.g., C/A bus 102, shown in FIG. 1). Receive framing unit 504 receives the write data frames from the DQ bus (e.g., DQ bus 104, shown in FIG. 1). The write data is written to memory array 508. In some embodiments, the write data is first posted to posted write buffer (PWB) 506 and then written to memory array 508. In other embodiments, the write data is written directly to memory array 508.

The write data is also provided to CRC generator 510 which computes a CRC checksum. In some embodiments, six levels of XOR trees are used to compute the CRC checksum. In alternative embodiments, a different number of XOR trees or a different algorithm may be used to generate the CRC checksum. In some embodiments, the write data path and the read data path use the same XOR trees to generate the CRC checksum.

CRC generator 510 stores the CRC checksum in CRC register 512. In some embodiments, CRC register 512 is a 64 bit register. The contents of CRC register 512 may be initialized to logical ones. Receive framing unit 504 provides a CRC checksum from a received CRC frame to comparator 514. Comparator 514 compares the received checksum with the locally generated checksum. If the checksums do not match, then an error signal is sent to the host. The host may resend the data (and associated CRC frame) if it receives the error signal.

Figure 6:
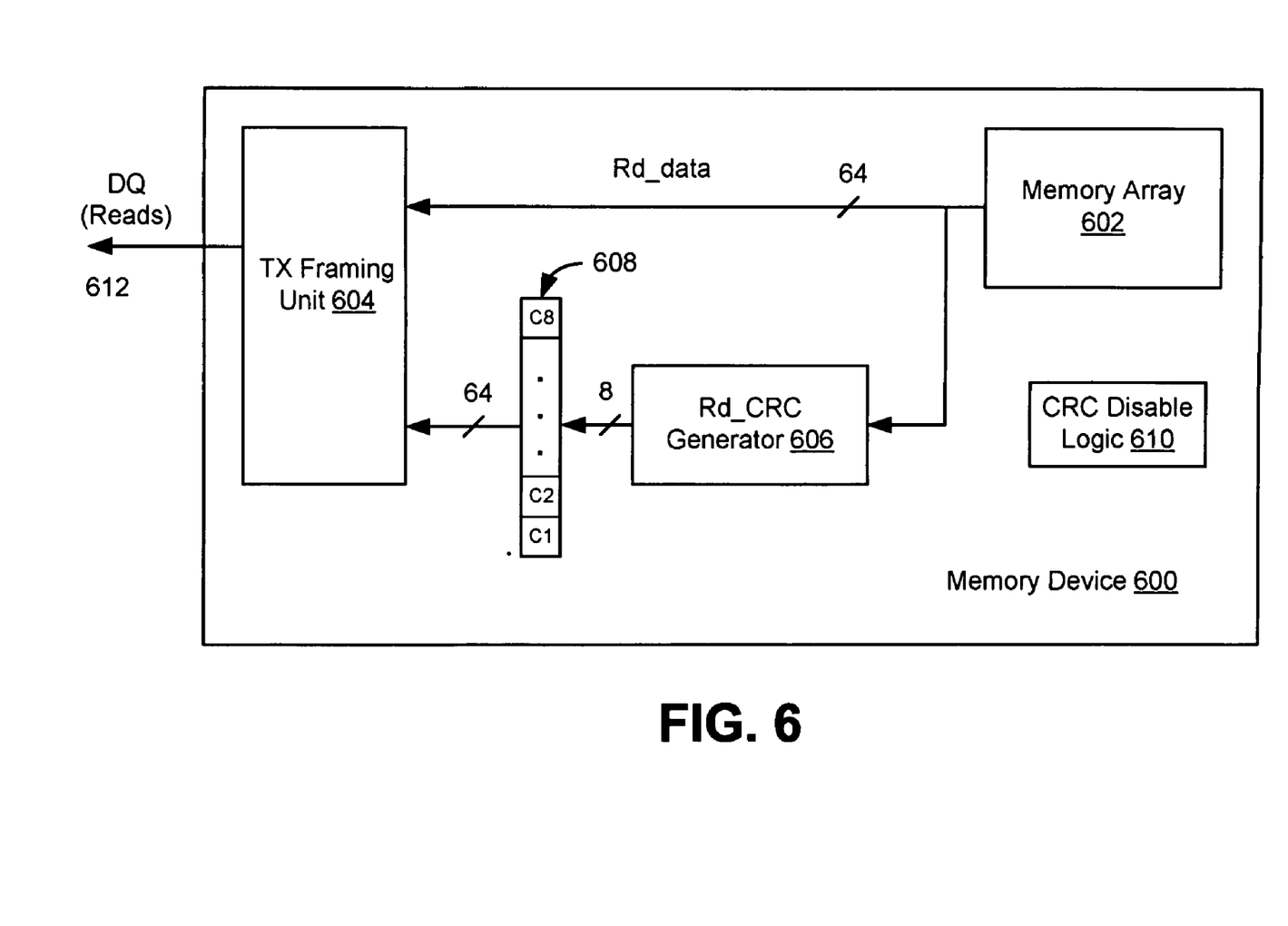
FIG. 6 is a block diagram illustrating selected aspects of a read data path for a memory device implemented according to an embodiment of the invention.

FIG. 6 is a block diagram illustrating selected aspects of a read data path for a memory device implemented according to an embodiment of the invention. Memory device 600 includes, inter alia, memory array 602, transmit (TX) framing unit 604, CRC generator 606, CRC register 608, and CRC disable logic 610. In alternative embodiments, memory device 600 may include more elements, fewer elements, and/or different elements. In some embodiments, memory device 600 is a dynamic random access memory device (DRAM).

In operation, memory device 600 receives a read command from the host (e.g., host 110) on a C/A bus (e.g., C/A bus 102). The data is read from memory array 602 and provided to TX framing unit 604. The read data is also provided to CRC generator 606 which computes a CRC checksum. In some embodiments, six levels of XOR trees are used to compute the CRC checksum. In alternative embodiments, a different number of XOR trees or a different algorithm may be used to generate the CRC checksum. In some embodiments, the read data path and the write data path use the same XOR trees to generate the CRC checksum.

CRC generator 606 stores the CRC checksum in CRC register 608. In some embodiments, CRC register 608 is a 64 bit register. The contents of CRC register 608 may be initialized to logical ones. TX framing unit 604 receives the checksum bits from generator 606 and frames them in a CRC frame. Thus, memory device 600 may separately transfer one or more read data frames and a corresponding CRC frame to the host via DQ bus 612.

Memory device 600 includes CRC disable logic 610. In some embodiments, CRC disable logic 610 disables the use of a CRC by memory device 600. Thus, in some embodiments, memory device 600 can be configured to use a CRC checksum with read data or configured to not use a CRC checksum with read data (and/or with write data). In some embodiments, CRC disable logic includes a portion of a mode register set (MRS).

Figure 7:
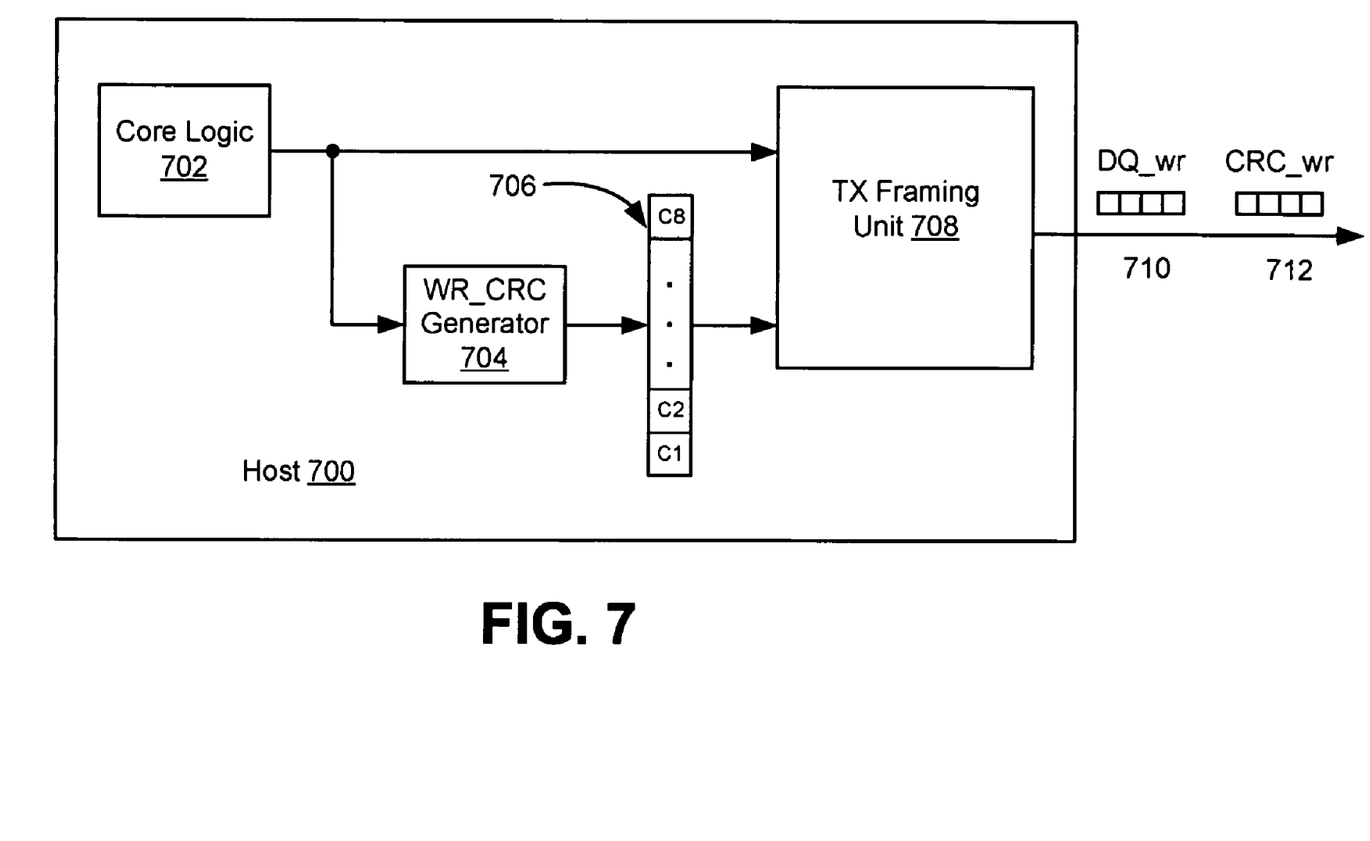
FIG. 7 is a block diagram illustrating selected aspects of a write data path for a host implemented according to an embodiment of the invention.

FIG. 7 is a block diagram illustrating selected aspects of a write data path for a host implemented according to an embodiment of the invention. Host 700 includes, inter alia, core logic 702, CRC generator 704, CRC register 706, and transmit (TX) framing unit 708. In alternative embodiments, host 700 includes more elements, fewer elements, and/or different elements. Core logic 702 includes, for example, scheduling logic to schedule reads and writes to main memory as well as retry logic to retry operations when a transmission error occurs.

In operation, core logic 702 schedules, for example, a write operation and provides the write data to TX framing unit 708 and to CRC generator 704. CRC generator 704 generates a CRC checksum based on the write data and stores the CRC checksum in CRC register 706. In some embodiments, six levels of XOR trees are used to compute the CRC checksum. In alternative embodiments, a different number of XOR trees or a different algorithm may be used to generate the CRC checksum. In some embodiments, the write data path and the read data path use the same XOR trees to generate the CRC checksum. In some embodiments, CRC register 706 is a 64 bit register. The contents of CRC register 706 may be initialized to logical ones.

TX framing unit 708 frames the write data into one or more write data frames (e.g., write data frame 710). In addition, TX framing unit 708 frames the CRC checksum (received from CRC register 706) into one or more separate CRC frames (e.g., CRC frame 712). The write data frame(s) and the CRC frame(s) are transferred to one or more memory devices (e.g., DRAMs) via the DQ bus.

Figure 8:
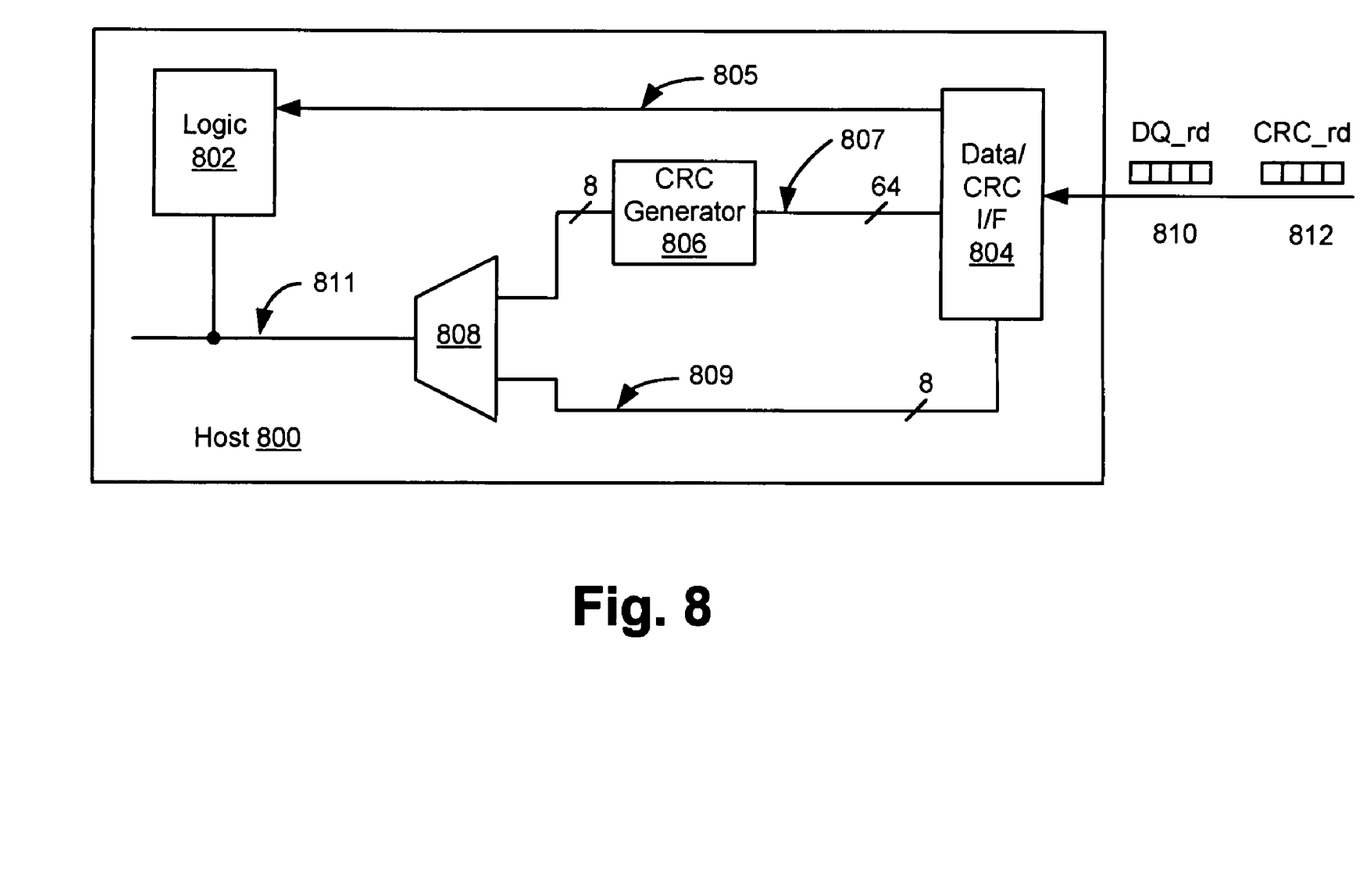
FIG. 8 is a block diagram illustrating selected aspects of a read data path for a host implemented according to an embodiment of the invention.

FIG. 8 is a block diagram illustrating selected aspects of a read data path for a host implemented according to an embodiment of the invention. Host 800 includes, inter alia, data/CRC interface (I/F) 804, CRC generator 806, comparator 808, and core logic 802. In alternative embodiments, host 800 includes more elements, fewer elements, and/or different elements. Data/CRC interface 804 provides an interface between host 300 and the DQ bus. Interface 804 may include a number of drivers, receivers, clocking circuits, and the like.

In operation, read data frames (e.g., 810) arrive at host 800 over the DQ bus. In addition, one or more CRC frames (812) covering the data in the read data frames arrive at host 800. Data/CRC interface 804 provides the read data to core logic 802 (at 805) and to CRC generator 806 (at 807). In addition, interface 804 provides the received CRC checksum to comparator 808 (at 809).

CRC generator 806 receives the read data and computes a "local" CRC checksum. The term "local" is used to distinguish between the CRC checksum generated by the host and the CRC checksum generated by the memory device. Comparator 808 compares the local CRC checksum (e.g., from CRC generator 806) with the CRC checksum received from the memory device. If they match, then output 811 indicates that the data is valid. If they do not match, then output 811 may provide an error signal.

Figure 9:
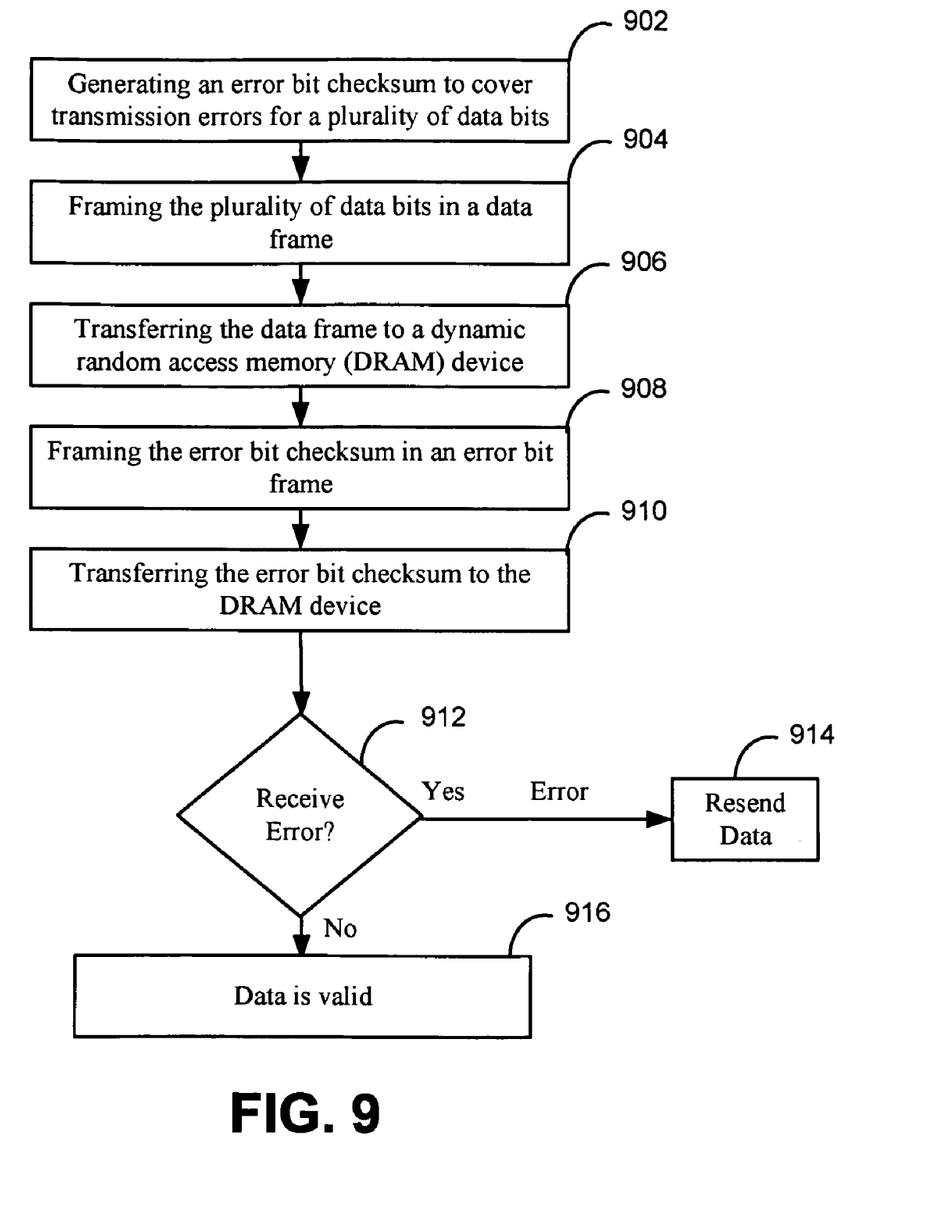
FIG. 9 is a flow diagram illustrating selected aspects of a method for writing one or more data frames and a separate error code frame, covering the one or more data frames, to a memory device.

FIG. 9 is a flow diagram illustrating selected aspects of a method for writing a data frame and a separate CRC frame, covering the data frame, to a memory device. Referring to process block 902, a host (e.g., a memory controller) generates an error bit checksum (e.g., a CRC checksum) to cover transmission errors for a plurality of data bits. In some embodiments, the host includes a CRC generator to generate the CRC checksum. The host may use the same CRC tree for the read data path and the write data path.

Referring to process block 904, transmit framing logic (e.g., transmit framing unit 604, shown in FIG. 6) frames the plurality of data bits into one or more data frames. In some embodiments, each data frame is eight UI in length. The one or more data frames are transferred to a memory device (e.g., a DRAM) via a data bus at 906.

The host frames the CRC checksum into a CRC frame at 908. In some embodiments, the CRC frame is separate and distinct from the data frames. The CRC frame is transferred to the DRAM via the data bus at 908. The CRC frame may be referred to as being "in-band" since it transferred over the DQ pins rather than one or more dedicated CRC pins.

In some embodiments, the DRAM uses the CRC frame provided by the host to determine whether a transmission error has occurred. For example, the DRAM may generate a "local" CRC checksum (based on the received data) and compare the local checksum with the received checksum. If a transmission error has occurred, the DRAM may send an error signal to the host. Referring to decision block 912, if the host receives an error signal, then it may resend the data (at 914). Alternatively, if the host does not receive an error signal, then the data may be valid (at 916).

Elements of embodiments of the present invention may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions. For example, embodiments of the invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the description above, certain terminology is used to describe embodiments of the invention. For example, the term "logic" is representative of hardware, firmware, software (or any combination thereof) to perform one or more functions. For instance, examples of "hardware" include, but are not limited to, an integrated circuit, a finite state machine, or even combinatorial logic. The integrated circuit may take the form of a processor such as a microprocessor, an application specific integrated circuit, a digital signal processor, a microcontroller, or the like.

It should be appreciated that reference throughout this specification to "one embodiment" or "an embodiment"

means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

What is claimed is:

1. A method comprising:
generating an error bit checksum to cover transmission errors for a plurality of data bits over a plurality of User Interval (UI) in length;
framing the plurality of data bits in a write data frame, wherein the write data frame is a first multiple of the UI in length;
transferring the write data frame to a dynamic random access memory (DRAM) device via one or more lanes of a data interconnect;
framing the error bit checksum in a write error bit frame, wherein the write error bit frame is a second multiple of the UI in length; and
transferring the write error bit frame to the DRAM device via the one or more lanes of the data interconnect, wherein only a subset of the plurality of UI in length are used to transfer the write error bit frame to the DRAM device in which some of the UI contain the write error bit frame and in which at least some of the UI do not contain the write error bit frame.

2. The method of claim 1, further comprising:
receiving an indication that a transmission error associated with the data frame was detected based, at least in part, on the error bit checksum; and
resending the data frame to the DRAM device.

3. The method of claim 1, further comprising:
issuing a first write command indicating that the write data frame is to be written to the DRAM device; and
issuing a second write command indicating that the error bit frame is to be written to the DRAM device.

4. The method of claim 1, further comprising:
issuing a single write command indicating that the write data frame and the error bit frame are to be written to the DRAM device.

5. The method of claim 1, further comprising:
receiving a read data frame from the DRAM device, the read data frame including a plurality of read data bits; and
receiving a read error bit frame from the DRAM device, wherein the read error bit frame includes a checksum covering at least some of the plurality of read data bits.

6. The method of claim 5, further comprising:
issuing a first read command indicating that the read data frame is to be read from the DRAM device; and
issuing a second read command indicating that the read error bit frame is to be read from the DRAM device.

7. The method of claim 5, further comprising:
issuing a single read command indicating that the read data frame and the read error bit frame are to be read from the DRAM device.

8. A dynamic random access memory (DRAM) device comprising:
receiving logic to receive a write data frame over a plurality of User Interval (UI) in length, wherein the write data frame is a first multiple of the UI in length, and a write error bit frame, wherein the write error bit frame is a second multiple of the UI in length, from a host, wherein the write error bit frame includes a checksum to cover one or more data bits of the write data frame, and wherein only a subset of the plurality of UI in length are used to transfer the write error bit frame to the DRAM device from the host, in which some of the UI contain the write error bit frame and in which at least some of the UI do not contain the write error bit frame;
write error bit generation logic to receive as an input the one or more data bits of the data frame and to provide as an output a locally generated checksum; and
comparison logic to compare the checksum with the locally generated checksum.

9. The device of claim 8, further comprising:
a memory array to provide one or more read data bits; read error bit generation logic to generate a read checksum;
a transmit framing unit to generate a read data frame based on the read data bits and to generate a read error bit frame based on the read checksum.

10. The device of claim 9, wherein the write error bit generation logic and the read error bit generation logic are the same.

11. The device of claim 9, wherein the read data frame is M user intervals (UI) long.

12. The device of claim 11, wherein M is eight.

13. The device of claim 11, wherein the read error bit frame is N UI long.

14. The device of claim 13, wherein N is a multiple of four.

15. An integrated circuit comprising:
error bit generation logic having as an input a plurality of write data bits to be transferred to a dynamic random access memory (DRAM) device over a plurality of User Interval (UI) in length and having as an output a write checksum to cover the plurality of write data bits; and
a framing unit to frame a write data frame, wherein the write data frame is a first multiple of the UI in length, based on the write data bits and a write error bit frame, wherein the write error bit frame is a second multiple of the UI in length, based on the write checksum, wherein only a subset of the plurality of UI in length are to be used to transfer the write error bit frame to the DRAM device in which some of the UI contain the write error bit frame and in which at least some of the UI do not contain the write error bit frame.

16. The integrated circuit of claim 15, further comprising:
command logic to issue write commands to the DRAM device, wherein the command logic is capable of issuing a write data command to indicate that a data frame is being written to memory and a write error bits command to indicate that a write error bit frame is being written to the DRAM device.

17. The integrated circuit of claim 16, wherein the command logic is capable of issuing a single write command to indicate that both a data frame and an error bit frame are being written to the DRAM device.

18. The integrated circuit of claim 15, further comprising:
a receive framing unit to receive a read data frame and a read error bit frame from the DRAM device, wherein the read data frame includes a plurality of read data bits and the read error bit frame includes a checksum covering at least a portion of the plurality of read data bits;
logic to generate a local checksum based, at least in part, on the plurality of read data bits; and
comparison logic to compare the local checksum with the local checksum.

19. The integrated circuit of claim 18, further comprising:
command logic to issue read commands to the DRAM device, wherein the command logic is capable of issuing a read data command to indicate that the read data frame is being read from memory and a read error bits command to indicate that the read error bit frame is being read from the DRAM device.

20. The integrated circuit of claim 19, wherein the command logic is capable of issuing a single read command to indicate that both the read data frame and the read error bit frame are being read from the DRAM device.

21. The integrated circuit of claim 15, further comprising:
logic to selectively enable error protection to cover the plurality of write data bits.

22. The integrated circuit of claim 15, wherein the plurality of write data bits are arranged in a serpentine pattern across two or more columns of the write data frame.

23. A system comprising:
a host including, error bit generation logic having as an input a plurality of write data bits to be transferred to a dynamic random access memory (DRAM) device over a plurality of User Interval (UI) in length and having as an output a write checksum to cover the plurality of write data bits, and a framing unit to frame a write data frame, wherein the write data frame is a first multiple of the UI in length, based on the write data bits and a write error bit frame, wherein the write error bit frame is a second multiple of the UI in length, based on the write checksum; and
a dynamic random access memory (DRAM) device coupled to the host via a memory interconnect to receive transfer of the write error bit frame from the host, wherein only a subset of the plurality of UI in length are used to transfer the write error bit frame to the DRAM device in which some of the UI contain the write error bit frame and in which at least some of the UI do not contain the write error bit frame.

24. The system of claim 23, wherein the host further includes command logic to issue write commands to the DRAM device, wherein the command logic is capable of issuing a write data command to indicate that a data frame is being written to memory and a write error bits command to indicate that a write error bit frame is being written to the DRAM device.

25. The system of claim 24, wherein the command logic is capable of issuing a single write command to indicate that both a data frame and an error bit frame are being written to the DRAM device.

26. The system of claim 23, wherein the host further includes a receive framing unit to receive a read data frame and a read error bit frame from the DRAM device, wherein the read data frame includes a plurality of read data bits and the read error bit frame includes a checksum covering at least a portion of the plurality of read data bits;
logic to generate a local checksum based, at least in part, on the plurality of read data bits; and
comparison logic to compare the local checksum with the checksum.

27. The system of claim 26, wherein the host further includes command logic to issue read commands to the DRAM device, wherein the command logic is capable of issuing a read data command to indicate that the read data frame is being read from memory and a read error bits command to indicate that the read error bit frame is being read from the DRAM device.

28. The system of claim 27, wherein the command logic is capable of issuing a single read command to indicate that both the read data frame and the read error bit frame are being read from the DRAM device.

29. The system of claim 23, wherein the DRAM device comprises:
receiving logic to receive the write data frame and the write error bit frame from the host;
write error bit generation logic to receive as an input the one or more data bits of the write data frame and to provide as an output a locally generated checksum; and
comparison logic to compare the checksum with the locally generated checksum.

30. The system of claim 29, wherein the DRAM device further comprises:
a memory array to provide one or more read data bits;
read error bit generation logic to generate a read checksum;
a transmit framing unit to generate a read data frame based on the read data bits and to generate a read error bit frame based on the read checksum.

31. The system of claim 30, wherein the write error bit generation logic and the read error bit generation logic are the same.

32. The system of claim 23, wherein the host is integrated onto the same die as one or more processors.

* * * * *